United States Patent
Pelletier et al.

(10) Patent No.: US 8,594,043 B2
(45) Date of Patent: Nov. 26, 2013

(54) SELECTIVE PACKET FORWARDING FOR LTE MOBILITY

(75) Inventors: Ghyslain Pelletier, Boden (SE); Mats Sagfors, Kyrkslatt (FI); Johan Torsner, Masaby (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 767 days.

(21) Appl. No.: 12/531,781

(22) PCT Filed: Feb. 13, 2008

(86) PCT No.: PCT/SE2008/050167
§ 371 (c)(1),
(2), (4) Date: Sep. 17, 2009

(87) PCT Pub. No.: WO2008/115125
PCT Pub. Date: Sep. 25, 2008

(65) Prior Publication Data
US 2010/0067489 A1      Mar. 18, 2010

(30) Foreign Application Priority Data

Mar. 21, 2007   (SE) .................................. 0700711-5

(51) Int. Cl.
*H04W 4/00*    (2009.01)
(52) U.S. Cl.
USPC ........................................................ 370/331
(58) Field of Classification Search
USPC ........................................................ 370/331
See application file for complete search history.

(56) References Cited

U.S. PATENT DOCUMENTS

2005/0163077 A1*  7/2005  Suda ............................. 370/331
2007/0047493 A1   3/2007  Park et al.
2007/0058543 A1*  3/2007  Fenart et al. ................... 370/230
2008/0002622 A1*  1/2008  Auterinen ...................... 370/331
2008/0123531 A1*  5/2008  Gerkis ........................... 370/235

FOREIGN PATENT DOCUMENTS

| JP | 2005-065335   | 3/2005 |
| JP | 2005-533418 A | 11/2005 |
| JP | 2006-237888   | 9/2006 |
| JP | 2008-514034 A | 5/2008 |
| WO | 2004068739 A1 | 8/2004 |
| WO | 2004/114695 A1| 12/2004 |

OTHER PUBLICATIONS

3rd Generation Partnership Project, 3GPP TSG RAN WG2 Ad Hoc on LTE, Source: NTT DoCoMo, Inc., "UE PDCP Reordering at Inter eNB Handover," Tdoc-R2-061925, pp. 1-5, Jun. 27-30, 2006, Cannes, France.
3rd Generation Partnership Project,TSG-RAN WG1 #45, Source: Ericsson, "Uplink Transport Format Selection in E-UTRA," R1-061363, pp. 1-2, May 8-12, 2006, Shanghai, China.
3rd Generation Partnership Project. "Data Forwarding with PDCP Located in eNB." 3GPP TSG-RAN WG3 #55, R3-070166, St. Louis, Missouri, US, Feb. 12-16, 2007.

* cited by examiner

*Primary Examiner* — Kenny Lin
(74) *Attorney, Agent, or Firm* — Coats and Bennett, P.L.L.C.

(57) ABSTRACT

Methods and devices are disclosed for forwarding data packets during handover in a packet-switched wireless communications system, such as a 3GPP Long-Term Evolution/System Architecture Evolution system. In an exemplary method, a source base station node determines that handover of at least one radio bearer for a served user terminal to a target base station node is imminent. The source base station node classifies a plurality of data packets into two or more data flow classifications according to a transmission status for each data packet, a service requirement for each data packet, or both and selectively forwards one or more of the data packets to the target base station node based on the data flow classification for each data packet. For example, data packets associated with a reliable delivery service requirement may be forwarded while data packets associated with a maximum delay service requirement are not.

27 Claims, 10 Drawing Sheets

SELECTIVE PACKET FORWARDING FOR LTE MOBILITY

TECHNICAL FIELD

The present invention relates to telecommunication systems, in particular to methods and apparatus for selective packet forwarding in a long-term evolution (LTE) wireless communication system.

BACKGROUND

Within the 3rd Generation Partnership Project (3GPP), the design and specification of the next generation of wireless communications networks is ongoing in an effort known as the Long Term Evolution (LTE) initiative. Along with the definition of new wireless interfaces, a new core network architecture is also being defined. This definition is known as System Architecture Evolution (SAE). As shown in FIG. 1, an LTE/SAE network includes two types of network elements supporting user and control planes: an enhanced base station 110, called the Evolved NodeB or "eNodeB"; and the Access Gateway (aGW) 120. The eNodeB 110 provides the LTE air interface and radio resource management, while the AGW provides a mobility anchor point for the user plane and provides a gateway to IP Service Networks 140, which may include the Internet, intranets, and other IP-based service networks.

Until recently, discussions regarding LTE mobility, i.e., handover from one eNodeB 110 to another, have been based on the assumption that the Packet Data Convergence Protocol (PDCP) is terminated in the LTE Access Gateway node 120 at one end and in the user equipment (UE) 160 at the other. PDCP, part of Layer 2, performs IP header compression and decompression, as well as ciphering and integrity protection of transmitted data. PDCP sequence numbers are added to user data, primarily for ciphering purposes; these sequence numbers may be used in handover procedures for reordering of packets and detection of duplicate packets. FIG. 2A thus illustrates the prior understanding of the allocation of Layer 1 and Layer 2 functionality between the UE 100, the evolved NodeB (eNodeB) 110, and the aGW 120. As shown in FIG. 2A, PDCP terminates in aGW 120, while the Radio Link Control (RLC) and Medium Access Control protocols terminate in the eNodeB 110.

Those skilled in the art will appreciate that a typical handover procedure in a system utilizing the architecture depicted in FIG. 2A need not involve the PDCP, because an inter-eNodeB 110 handover does not require a change in aGW 120. One advantage of this architecture is that header compression can continue through a handover process without being restarted or moved to another node in the radio access network or in the core network. This applies to both uplink and downlink data transfers.

Recently, however, 3GPP has decided to locate the PDCP functionality in the eNodeB, rather than in the aGW, as shown in FIG. 2B. The move of PDCP functionality to the eNodeB has several implications for mobility. For instance, the header compression functionality in the PDCP "moves" from the source eNodeB 110 to the target eNodeB 110 during handover.

Header compression requires flow classification—the header of each incoming IP packet must be inspected in order for the compressor to identify the flow to which the packet belongs, and the corresponding compression state to use. When multiple IP flows with varying service requirements share the same PDCP instance, it is then possible to identify and distinguish between IP packets based on their service requirements at the eNodeB 110. For example, different IP flows may have different requirements with respect to avoidance of duplicate packets, loss of packets, in-sequence delivery, interruption time, and/or jitter.

SUMMARY OF THE INVENTION

In the presently claimed methods and apparatus for forwarding packets during handover in a packet-switched wireless communications network, a source base station performs selective forwarding of packets such that some packets are forwarded and others are not. The forwarding decision may be made for packets that are being processed by radio link protocols at the initiation of handover, buffered in the source eNodeB in preparation for transmission, and/or incoming from an access gateway. The forwarding decision may be based on a classification of packets using one or more of: a Radio Link Control (RLC) state, which may include RLC status reports, Hybrid Automatic Repeat Request (HARQ) state, or contents of the RLC retransmission buffers; the type of IP traffic corresponding to each packet, such as might be determined based on inspection of IP headers; and quality-of-service requirements associated with one or more logical channels, each logical channel comprising one or more IP flows. By classifying packets and selectively forwarding only some packets, system performance may be improved with respect to the service requirements associated with each IP flow. These service requirements might include, for instance, duplication avoidance, guaranteed delivery, delay and jitter limits, and requirements for in-sequence delivery.

As will be illustrated below, these forwarding principles may be tied to the handover procedures in the user equipment (UE) and the source and target eNodeBs. When handovers may be performed for one bearer at a time (which is currently not the case for LTE systems), the same principles may be applied to the IP flows carried by the bearer undergoing handover. Thus, some packets, corresponding to one or more IP flows carried by the bearer to be handed over, may be forwarded, while others are not, according to service requirements associated with the IP flows and/or the radio link control status. When the handover over the air interface is simultaneous for all bearers, the principles and methods described herein may also be applied at the bearer level. Thus, packets corresponding to one or more bearers may be forwarded, while others are not, according to service requirements and/or link status associated with the bearers.

Accordingly, in an exemplary method for forwarding data packets during handover in a packet-switched wireless communications system, a source base station node determines that handover of at least one radio bearer for a served user terminal to a target base station node is imminent. The source base station node classifies a plurality of data packets into two or more data flow classifications according to a transmission status for each data packet, a service requirement for each data packet, or both, and selectively forwards one or more of the data packets to the target base station node based on the data flow classification for each data packet. In some embodiments, the source base station node classifies the data packets by inspecting an Internet Protocol header for each packet to determine a corresponding service requirement. In some embodiments, the source base station classifies data packets by evaluating a radio link control status to determine a transmission status for each data packet. In either or both cases, the source base station selectively forwards data packets corresponding to one or more of the classifications. For example, data packets associated with a reliable delivery service requirement may be forwarded, while data packets associated with a maximum delay service requirement are not.

The present invention offers the advantage that the eNodeB may fulfill specific requirements during handover at the granularity of the IP packet, i.e. per IP flow. For instance, interruption time may be minimized for VoIP flows while simultaneously ensuring reliability and in-sequence delivery for TCP flows sharing the same PDCP pipe/RLC logical channel.

DETAILED DESCRIPTION

Figure 1:
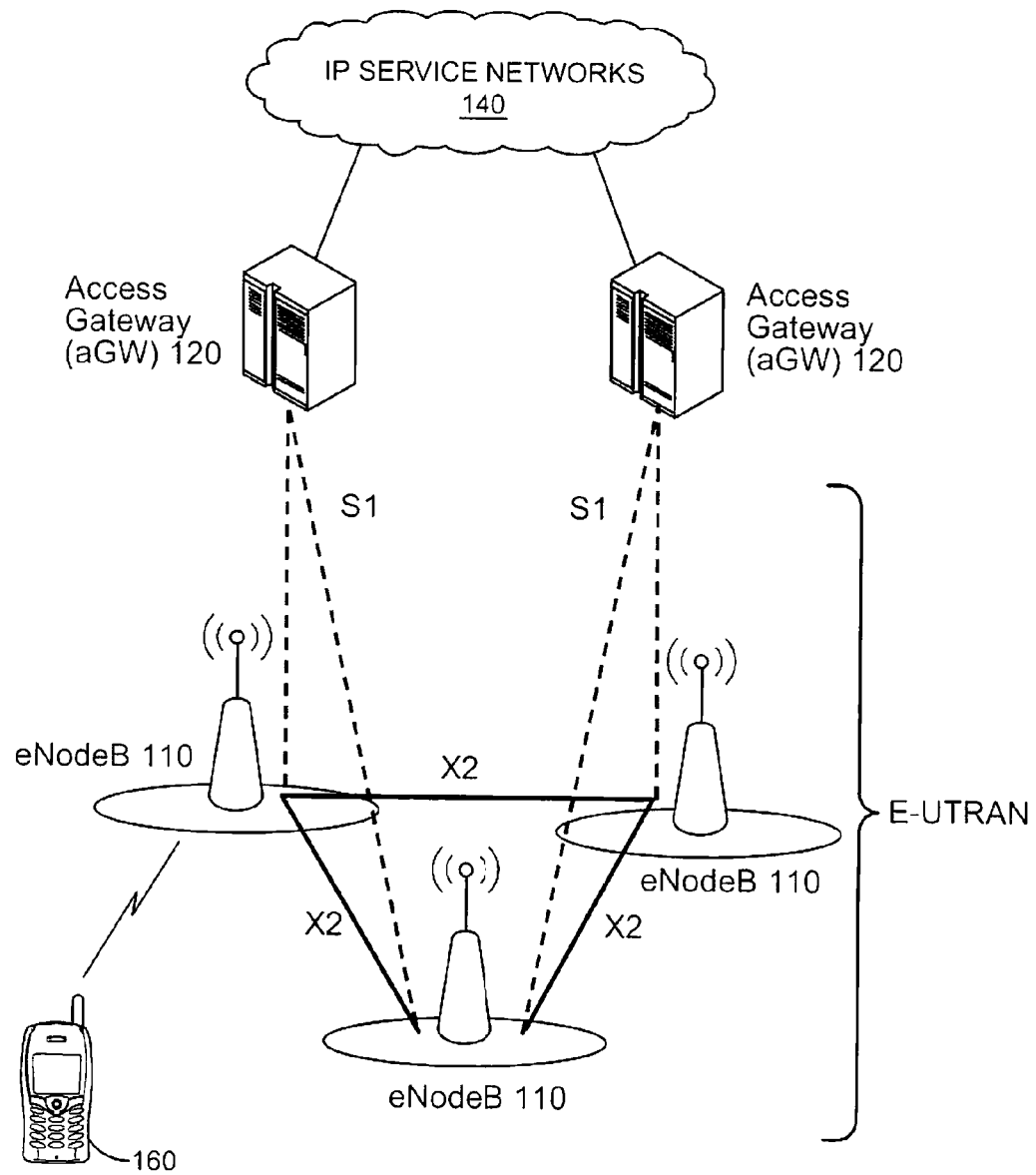
FIG. 1 illustrates a communication network including an LTE/SAE network.
Figure 2A:
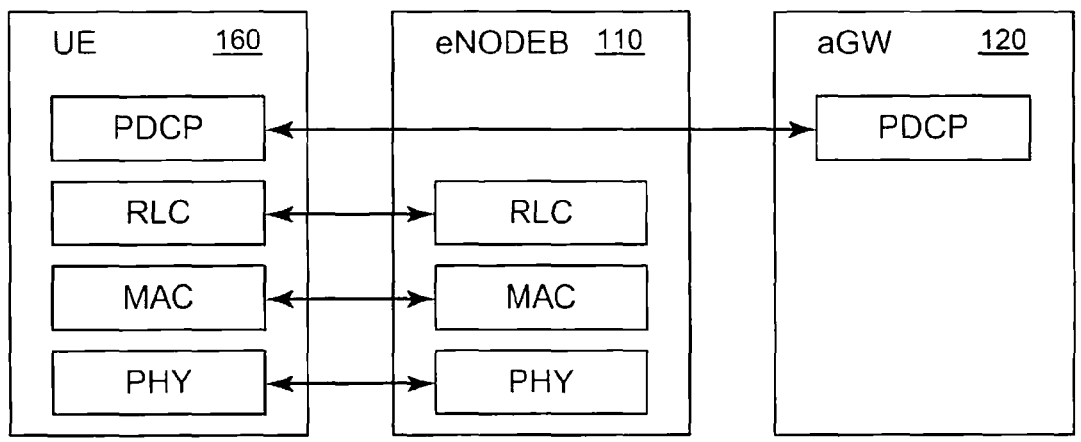
FIG. 2A illustrates one allocation of protocol resources among the network elements of FIG. 1.
Figure 2B:
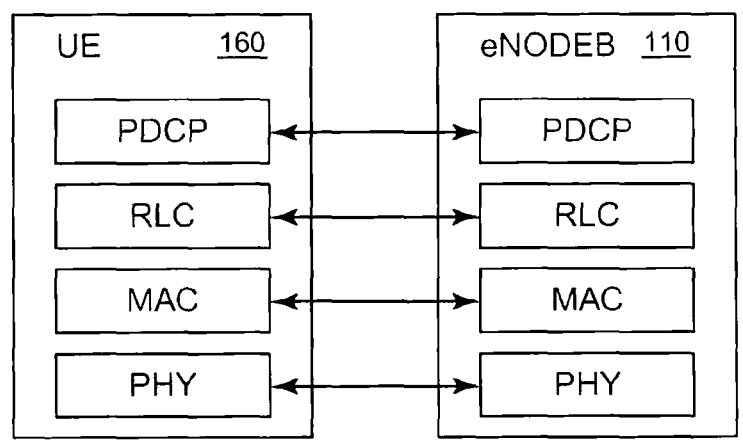
FIG. 2B illustrates another allocation of protocol resources among the network elements of FIG. 1.

As discussed above, FIG. 1 illustrates basic elements of the architecture for an LTE communication system. As a result of moving PDCP functions, namely header compression and ciphering, to the eNodeB 110, the eNodeB 110 is able to inspect IP packet headers. If header compression and/or ciphering were performed at the aGW 120, as previously planned, inspecting IP headers at the eNodeB 110 would be impossible. As will be described more fully below, this ability to inspect IP headers enables several aspects of the methods and apparatus disclosed herein for forwarding packets during handover in a wireless communication system.

In an LTE system, data packets designated for transmission to a user equipment (UE) may be forwarded from a source eNodeB, i.e., the eNodeB serving a UE before a handover decision is taken, to a target eNodeB. The downlink packets intended for a given UE may correspond to several IP flows; each of these IP flows may have different quality-of-service (QoS) requirements with respect to tolerance for duplicate packets, losses, interruption time, in-sequence delivery, delay and jitter, and so on. By inspecting packet headers, an eNodeB may distinguish between packets belonging to different IP flows. For instance, an eNodeB may use packet header data such as source and destination addresses, source and destination ports, service type, and transport protocol to classify the packets into several IP flows. As will be appreciated by those skilled in the art, forwarding decisions taken by the eNodeB in some cases may be driven by pre-programmed rules based on certain flow types, while the forwarding decision in others may be based on the contents of the IP headers. For instance, Type of Service parameters included in an IP packet header may be used to determine forwarding behavior. Generally speaking, information regarding service requirements for a given IP flow, session, or logical channel, whether determined from IP headers or otherwise, may be used to determine forwarding behavior during handover. System and/or link status information may also be utilized in forwarding decisions.

Figure 3:
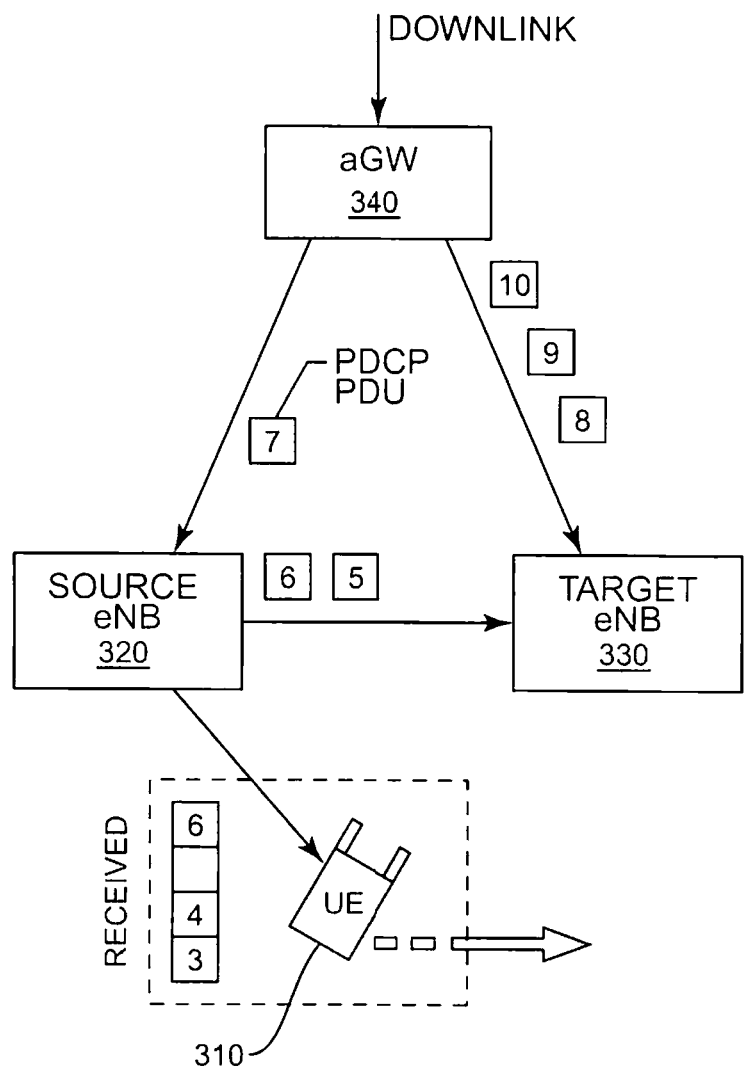
FIG. 3 illustrates user-plane mobility issues during handover in a wireless communications system.

FIG. 3 illustrates some of the issues associated with user-plane mobility. In general, it is desirable to provide means for in-sequence and lossless delivery, without duplicates and with minimal delays. Duplicates may arise when packets are received at a mobile terminal from both the source eNodeB and the target eNodeB. This may occur, for example, when a transmitted and received packet has not yet been acknowledged when handover occurs. In FIG. 3, this is the case with PDCP packet data unit (PDU) 6—although received by UE 310 from source eNodeB 320, it has not been acknowledged at the time of handover. Thus, source eNodeB 320 forwards PDCP PDU 6 to the target eNodeB 330. After handover, PDCP PDU 6 will be transmitted to mobile terminal 310 again. (Those skilled in the art will recognize that this scenario is most applicable when a radio link control ARQ scheme is "reset" at the time of handover, i.e., when no radio link control (RLC) context is transferred. With RLC context transfer, duplicates may be avoided, but potentially at the expense of additional delay and increased complexity in the system.)

Out-of-sequence transmission of packets may occur when "younger" packets (sent by access gateway 340) arrive earlier than forwarded packets at the target eNodeB 330, because of different transport delays over the access gateway-to-eNodeB and eNodeB-to-eNodeB interfaces. (In LTE, these interfaces are known as the S1 and X2 interfaces, respectively.) In FIG. 3, this is illustrated most clearly with PDCP PDU 7. Although PDCP PDUs 5 and 6 may arrive at the target eNodeB 330 before PDCP PDUs 8, 9, and 10, PCDP PDU 7 is likely to arrive later, as it has not yet been forwarded by the source eNodeB 320.

As discussed above, forwarding is generally performed at handover between source eNodeB and target eNodeB, such as the source eNodeB 320 and target eNodeB 330 of FIG. 3. In previous systems, forwarding has generally been performed per PDCP entity. Normally, one PDCP entity corresponds to a logical channel with a corresponding set of Qos characteristics, which are in turn related to service requirements such as requirements for lossless delivery, no duplication, or in-sequence delivery, as well as service requirements constraining delay and/or interruption time characteristics.

However, the PDCP logical channel may include two or more separate IP flows. Different IP flows may have different service requirements, especially with respect to duplication avoidance, delivery reliability, in-sequence delivery, or interruption time and/or jitter. In order to maintain services during mobility, i.e., across handovers, the source eNodeB forwards packets to the target eNodeB until the S1 path is updated (routing update). During a handover, IP packets may be undergoing transmission in the source eNodeB. Some RLC packet data units (PDUs) may have been transmitted, but not acknowledged. (As those skilled in the art will appreciate, some ARQ schemes may employ PDU-by-PDU acknowledgments, while others may rely on less frequent RLC status reports.) In some systems, RLC may be reset at handover, i.e., it may abort any incomplete transmissions. Other systems may stop new transmission attempts, while attempting to complete ongoing transmissions. Yet others may simply continue operation by transferring detailed RLC status information (RLC context) to the target eNodeB. As will be discussed in more detail below, differences in service requirements and transmission status may be utilized to improve the forwarding process and improve system performance.

Figure 4:
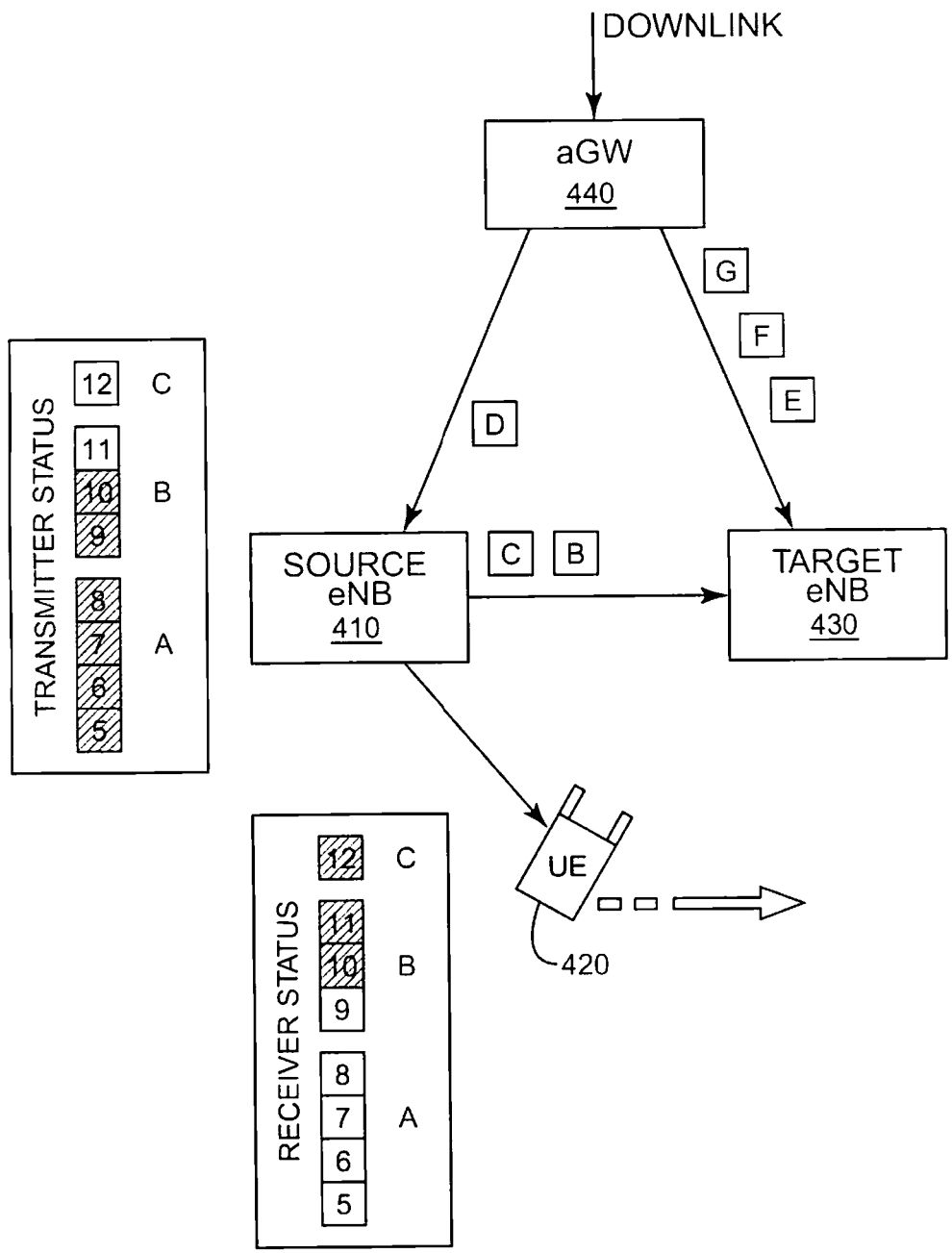
FIG. 4 illustrates user-plane mobility issues related to RLC behavior during handover in a wireless communications system.

An example of RLC behavior is shown in FIG. 4. This figure illustrates a scenario without RLC ARQ context transfer, implying that there are no receiver sequence numbers for duplicate detection and downlink re-ordering. Maintaining in-sequence transmissions without duplicates after handover thus requires reliable status reporting for the handover. In the example of FIG. 4, PDCP PDUs are labeled A, B, C, etc., while RLC PDUs (in this case, segmented PDCP PDUs) are labeled 5, 6, 7, etc. In the figure, source eNodeB 410 has transmitted to user terminal 420 RLC PDUs up to RLC PDU 12, but has only received RLC status reports confirming delivery of RLC PDUs up to RLC PDU 10. Thus, at handover, transmission of PDCP PDU B is incomplete, and PDCP PDU B and subsequent PDCP PDUs are forwarded to target eNodeB 430. The transmission of any packets should be stopped during the status reporting. After handover and the resulting S1 path switch, subsequent PDCP PDUs are supplied by SAE gateway 440 directly to target eNodeB 430. In order for the target eNodeB 430 to ensure in-sequence delivery, S1/X2 protocol support may be required. In general, the risk for duplicates and out-of-sequence delivery can be traded with Layer 2 interruption delays during handover.

Packet forwarding and RLC behavior may obviously impact IP flows with respect to service requirements regarding duplication, losses (reliability), reordering and interruption time (delay and jitter). Some of these service requirements may imply contradictory forwarding and RLC goals. For example, if an IP flow or bearer requires reliable status reporting, this generally means that handover execution will be prolonged, negatively impacting delay and jitter performance. If different IP flows are associated with different service requirements, there are thus conflicting forwarding and RLC requirements for IP flows terminated in the same user terminal.

This problem may be exacerbated when all IP flows associated with the same RLC logical connection receive the same treatment with respect to forwarding and RLC behavior. In some systems, all logical connections (i.e. several flows grouped logically in the same PDCP logical channel) may be always handled identically during a handover, thus favoring some service requirements at the expense of others. In other systems, RLC and forwarding policies may be applied differently from one logical channel to another, but based on the characteristics of the entire logical channel (as opposed to the characteristics of one or more prioritized IP flow, session, or service carried on that PDCP logical channel).

A solution to improve efficiency of packet forwarding thus preferably includes one or more of the following characteristics. First, it should be possible to immediately forward packets belonging to a subset of the flows associated with either one PDCP or one RLC instance. Second, it should be possible to immediately forward packets belonging to a subset of the logical connections (where a logical connection may comprise several IP flows), based on a prioritized characteristic of one or more of the IP flows in each logical connection. Third, it should be possible to base the forwarding decision on the requirements of the service to which the IP packet belongs, i.e., the service requirements associated with a given IP packet's IP flow. Finally, forwarding policy should be independent of the behavior of the RLC procedure.

Figure 5:
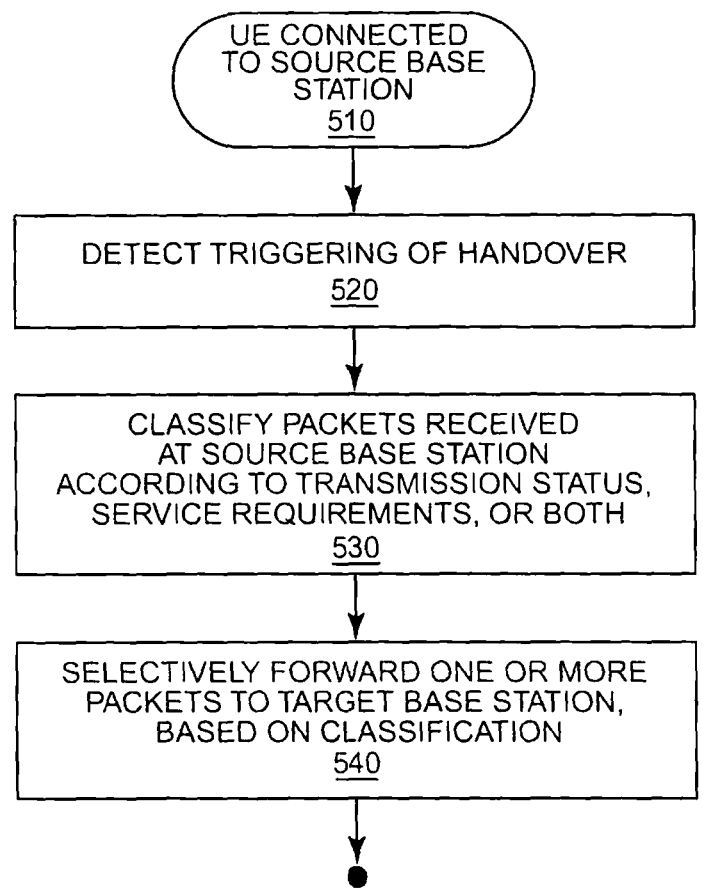
FIG. 5 illustrates an exemplary method for forwarding packets in a wireless communications system.

FIG. 5 illustrates an exemplary method for forwarding data packets during handover in a packet-switched wireless communications system that meets one or more of the preceding system design goals. The method of FIG. 5 may be implemented at an eNodeB, such as the source eNodeB 410 illustrated at FIG. 4, and is described below in reference to the components of FIG. 4. However, those skilled in the art will appreciate that the methods described below may be applied to other system configurations as well.

The method begins at block 510, where a user terminal 420 is connected to a source eNodeB 410. At block 520, a handover is triggered according to conventional means. For instance, the handover may be triggered by the source eNodeB 410 in response to changed channel conditions. At block 530, packets received at the source eNodeB 410 are classified according to transmission status, service requirements associated with the packets, or both. The packets to be classified may include packets that are currently undergoing transmission, for example, packets that are still being processed by the RLC layer. The packets to be classified may further include packets that are buffered in the source eNodeB 410 in preparation for transmission, and packets sent from the access gateway 440 prior to the switching of the S1 interface to the target eNodeB 430. Finally, at block 540, packets are selectively forwarded to the target eNodeB 430, based on the packet classification.

Classification of packets may be based on one or several of the following criterion: an RLC status report corresponding to one or more packets; the RLC state, including HARQ status, of which the RLC status report and/or RLC retransmission buffer state may form a part; IP flow classification (generally based on IP header inspection); one or more QoS requirements associated with an IP flow, session, or RLC instance; and one or more packet filters. Knowledge of requirements associated with particular IP flows or types of flows may also be used for classification. For instance, services or types of data such as VoIP service, TCP or UDP traffic, streaming data (RTSP, etc.), control data, signaling data, and the like may each be associated with one or more service requirements that determine the classification of the corresponding packets. In some instances, the classification may simply comprise two categories, such as "Always Forward" and "Never Forward." In other cases, the classification may comprise additional categories that may be subject to more complex rules. Thus, some classification categories may be forwarded under some combination of system/eNodeB circumstances, while not forwarded under others. In some embodiments, such as embodiments employing status-based forwarding decisions, "filter information" may be sent from the source eNodeB 410 to the target eNodeB 430 to inform the target eNodeB 430 as to the forwarding policy currently in use by the source eNodeB 410.

In some embodiments, the RLC in the source eNodeB 410 may initiate new transmissions for specific packets, until the mobile terminal 420 is finally handed over to the target eNodeB 430, based on the same information derived for the packet. For instance, packets belonging to a classification associated with a maximum delay requirement might in some embodiments never be forwarded to the target eNodeB 430, as doing so would likely result in unacceptable delays. (In some embodiments, a no-forwarding policy might be applied to all packets having a maximum delay requirement, on the assumption that the maximum delay would be exceeded. In others, the maximum delay requirement may be evaluated on a packet-by-packet basis to determine whether to forward each packet.) These same packets, however, may continue to be transmitted by the source eNodeB 410 on a best-efforts basis until the handover is complete. Those skilled in the art will appreciate that by prioritizing these low-delay packets for immediate transmission, while designating other packets for forwarding, service requirements for various packet classifications are more likely to be met than if a single policy were applied to all packets.

In some embodiments, the target eNodeB 430 may use a similar approach to determine when to begin transmission for packets received from the access gateway over the S1 interface. For instance, packets belonging to IP flows corresponding to a in-sequence delivery service requirement may be intentionally delayed while the target eNodeB 430 waits for further packets belonging to the same IP flow to be received from the source eNodeB 410 over the forwarding interface. In the meantime, packets received from the access gateway having a low delay service requirement (but no in-sequence delivery requirement) might be transmitted to the mobile terminal 420 immediately. These transmission decisions, based on packet classification, may be based on local implementation and policy, but might also be based on information provided by the source eNodeB 410 (e.g., the filter information discussed above).

Figure 6A:
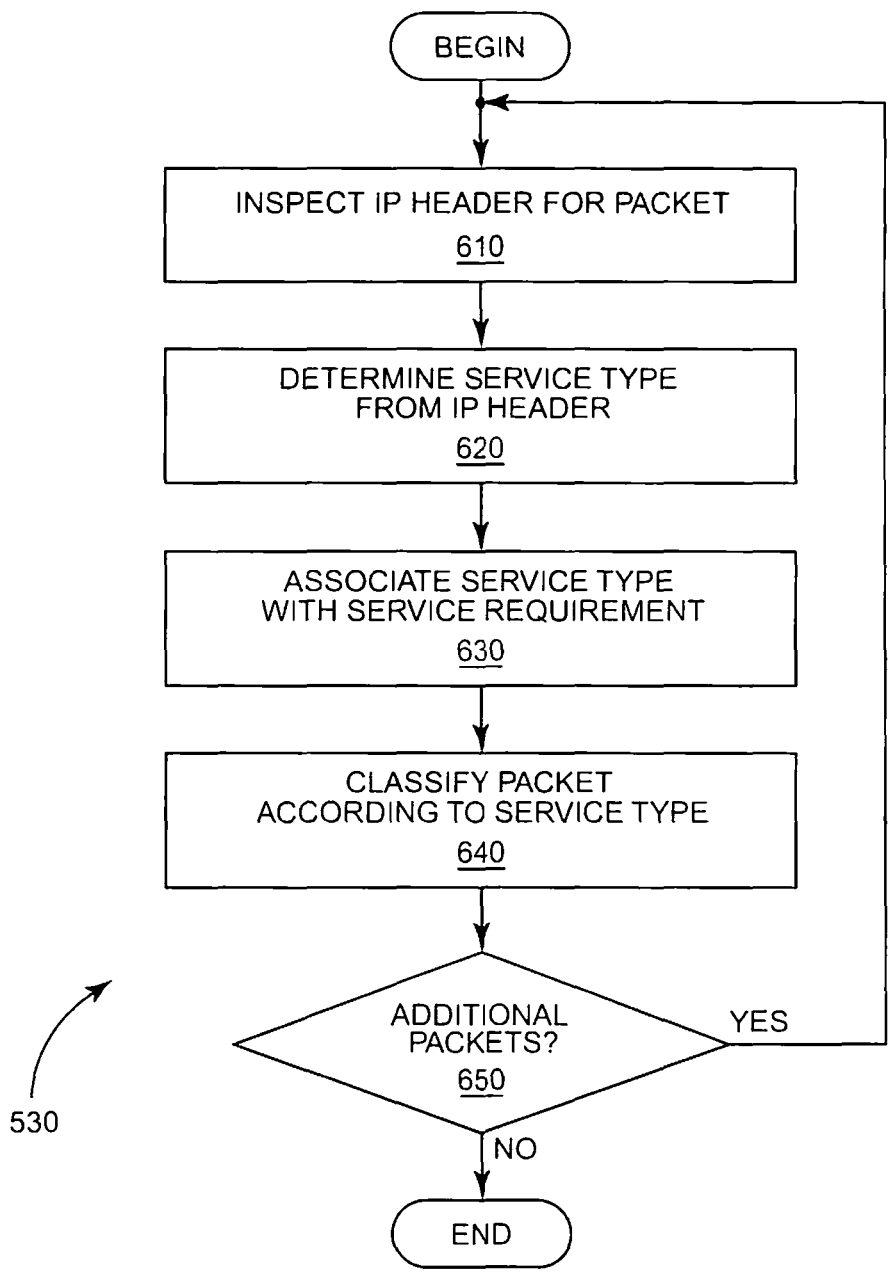
FIGS. 6A and 6B illustrate methods for classifying packets according to one or more embodiments of the present invention.

As mentioned above, each packet may be classified according to an associated service requirement, a transmission status for the packet, or both. In some embodiments, classifying packets according to service requirements may be accomplished by inspecting the IP header for each packet. FIG. 6A illustrates an exemplary method based on this process. At block 610, the IP header for a packet to be classified is inspected. As was noted earlier, locating PDCP functionality in the eNodeB permits the IP header to be inspected at the eNodeB. (Otherwise, header compression and ciphering performed before the packet is received would interfere with IP header inspection.) At block 620, a service type is determined from the IP header. In some embodiments, the service type may be determined by associating one or more fields of the IP header with predetermined service types. For instance, certain source or destination addresses, or certain source or destination ports may be known to correspond to particular service types. Transport protocols, e.g., TCP, UDP, etc., signaled by the protocol field of the IP header may indicate or correspond to particular service types. Service types may also be indicated by the type-of-service field in the header.

In some embodiments, a service requirement may be determined by inspecting packet headers corresponding to a particular type of payload. For example, packets carrying Real-time Transfer Protocol (RTP) data include an RTP header. The RTP header includes a payload-type field, which indicates the format (e.g., encoding) of the payload. From this field, service requirements may be inferred. For instance, for video data, certain frame types, such as I-frames, may be prioritized over others, such as P- and B-frames.

Once a service type is determined for an IP packet, the service type may be associated with a service requirement, as shown at block 630. In some embodiments, the mapping between service types and service requirements may be according to a pre-determined table. The packet is then classified according to the service type, as shown at block 640. There may be a single classification for each service type, or several service types may be mapped to a single classification. As discussed above, this classification of packets by service requirements may provide the basis for the selected forwarding of packets. The process may then be repeated, as indicated by block 650, until all packets have been classified.

Figure 6B:
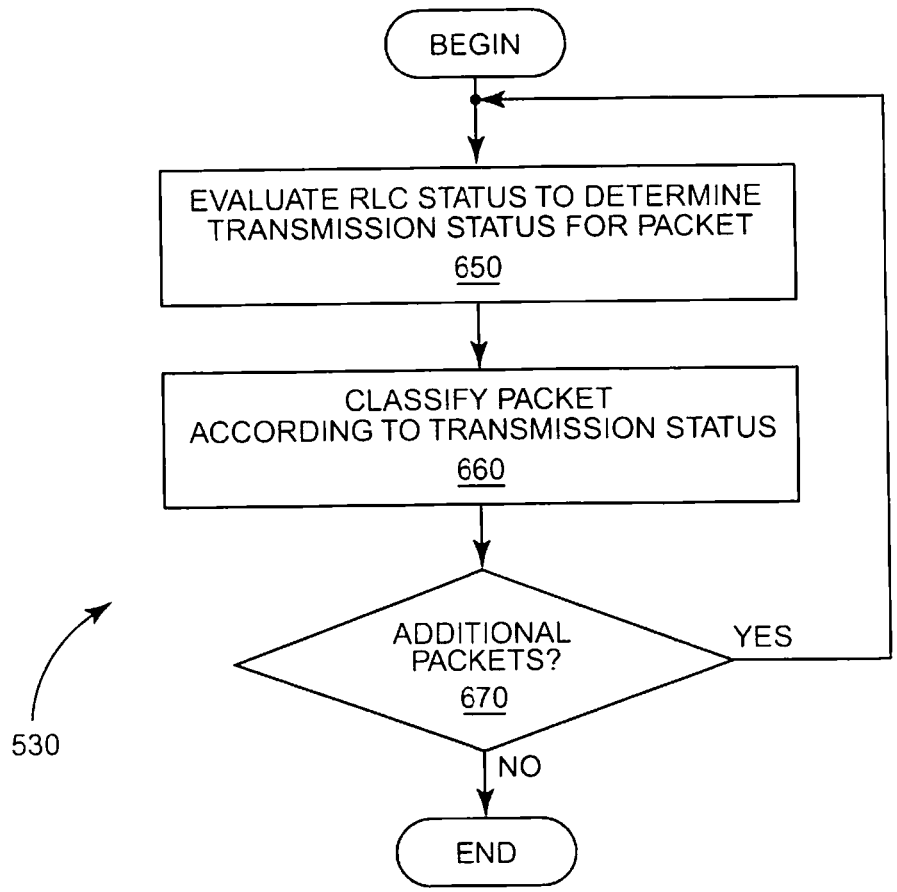

FIG. 6B illustrates an exemplary procedure for classifying packets according to transmission status. Those skilled in the art will appreciate that classification by transmission status may be performed instead of or in addition to classification by service requirements. At block 650, the radio link control status is evaluated at the eNodeB to determine the transmission status of one or more packets. This evaluation may include the inspection of RLC status reports received from the mobile station 420 to be handed over. (In some embodiments, a priority or service requirement associated with a given logical channel or a given IP flow may be used to selectively request status reports for one or more of multiple bearers. In other embodiments, status reports may be requested at handover only for bearers for which there is outstanding data according to a current RLC status.)

At block 660, the packets are classified according to their transmission status. The process is repeated as necessary, as shown at block 670. Packet classification by transmission state may be as simple as sorting packets into acknowledged and unacknowledged classes. On the other hand, more elaborate classifications may be used. For example, an additional classification may comprise packets that have actually been transmitted, but not yet acknowledged or the subject of an RLC status report. Like the classifications by service requirements, the classifications by transmission status may be used to drive forwarding decisions. In many embodiments, packets that have actually been acknowledged will not be forwarded at all. In some embodiments, packets that have been transmitted, but not acknowledged, might be forwarded if associated with a reliability service requirement, but not forwarded otherwise. Those skilled in the art will appreciate the variety of rules that may be formulated to handle forwarding decisions for any of a variety of packet classifications.

As illustrated above, packets may be classified according to, inter alia, service requirements associated with individual IP flows. In some embodiments, packets may be classified instead according to a service requirement associated with an entire logical channel. A logical channel, which may be associated with a single PDCP entity and/or a single LTE radio bearer, may comprise several IP flows. A given mobile terminal 420 may be receiving two or more of these logical channels at one time. Each of these logical channels may be implicitly or expressly associated with a different priority level or different service requirement. In such cases, packets associated with a high priority logical channel may be forwarded during handover, while packets associated with a lower priority channel may be dropped.

In some cases, the priority or service requirement associated with a given logical channel may be according to a pre-determined relationship. In other cases, however, the priority or service requirement for a logical channel may be determined by service requirements associated with one or more of the IP flows carried by the channel.

Figure 7:
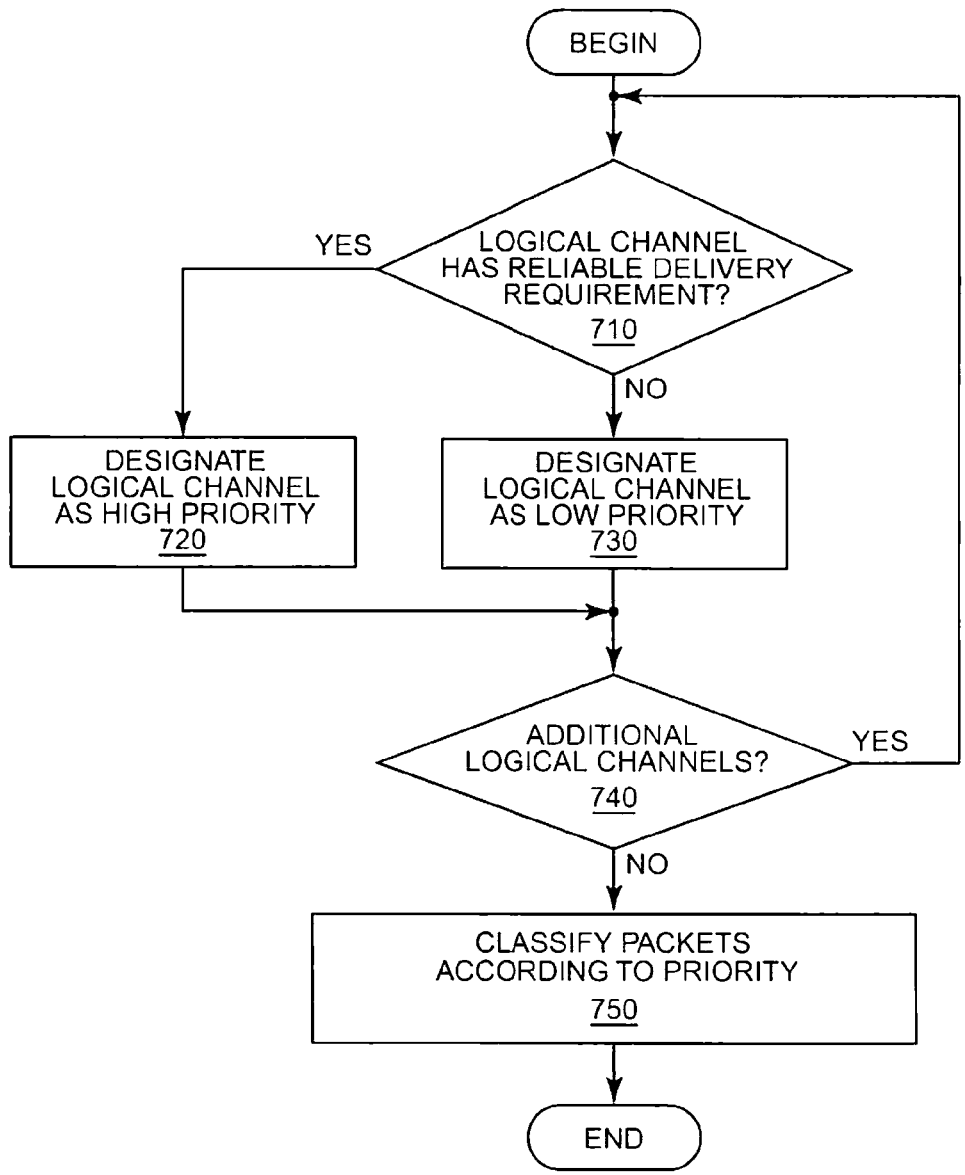
FIG. 7 illustrates another method for classifying packets according to one or more embodiments of the present invention.

FIG. 7 illustrates an exemplary method for classifying packets according to logical channel priorities. At block 710, a logical channel is evaluated to determine whether it has a reliable delivery requirement. In some cases, such a requirement may be implied for a given logical channel based on the logical channel type. In other cases, IP headers or other information may be evaluated to determine whether the logical channel carries one or more IP flows qualifying (according to some pre-determined criteria) as high-priority IP flows. Thus, in some embodiments, a logical channel might be classified into one or more priority levels according to the highest priority IP flow that it carries. Other rules for determining a priority level for a logical channel are of course possible, as will be appreciated by those skilled in the art.

In the example illustrated in FIG. 7, logical channels associated with a reliable delivery requirement are assigned a relatively high priority classification, as shown at block 720. On the other hand, logical channels not associated with a reliable delivery requirement are assigned a relatively low priority classification, as illustrated at block 740. Other service requirements may be evaluated (instead of or in addition to a reliable delivery requirement) in a similar manner to classify the logical channels according to two or more relative priority levels. At block 740, the process is repeated for remaining logical channels.

Finally, at block 750, packets are classified according to the priorities of their logical channels. Thus, in some embodiments, relatively high priority packets may be forwarded to the target eNodeB 430, while relatively low priority packets are not. As with other classifications, classifications according to the priorities of the logical channel may be used not only for forwarding decisions, but also in deciding whether additional packets should be transmitted before handover is completed. Furthermore, although some systems may require that all logical channels be handed over simultaneously, other systems might permit handover of logical channels or radio bearers on an individual basis, i.e., one at a time. In these systems, then, the classification methods described herein might be used to determine which logical channels or radio bearers should be handed over first and when packet forwarding should be used.

Figure 8:
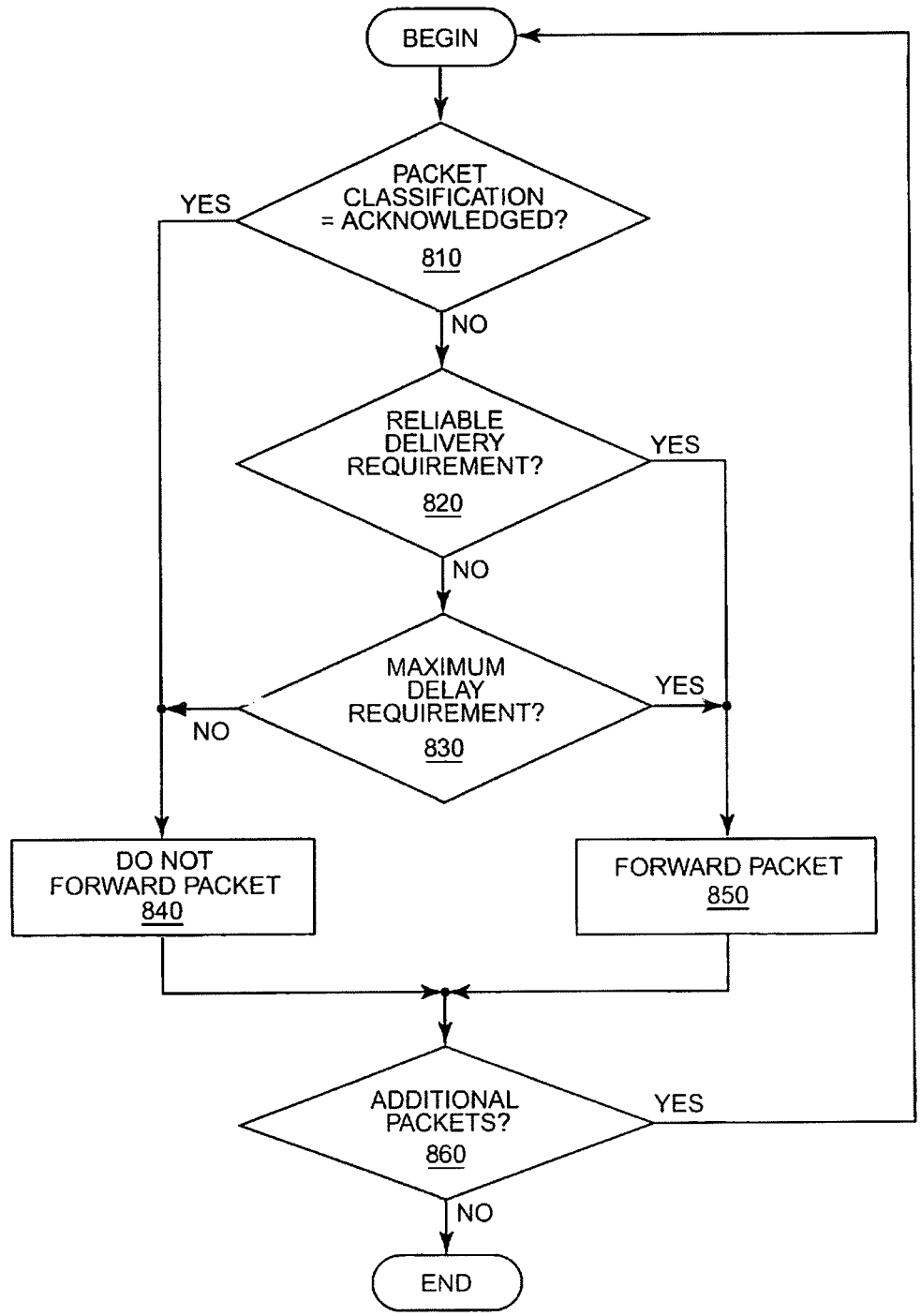
FIG. 8 illustrates a method for forwarding packets according to some embodiments of the invention.

FIG. 8 illustrates one approach that might be used for forwarding decisions in an eNodeB using one or more of the classification approaches above. The process begins with at least one packet that has already been classified. At block 810, a packet transmission status classification is evaluated. If the packet classification indicates that the packet has been acknowledged, then the packet is not forwarded, as indicated at block 840. On the other hand, if the packet has not been acknowledged, it is not immediately forwarded, but its classification is further examined. Thus, at block 820, if the packet is classified according to a reliable delivery requirement, it is immediately forwarded, as shown at block 850. If not, the packet is evaluated at block 830 to determine whether it is classified according to a maximum delay requirement. If so, it is immediately forwarded (block 850); if not, it is not forwarded (block 840). The process repeats, as indicated at block 860, until there are no remaining classified packets to be processed.

The process illustrated in FIG. 8 illustrates but one of a wide variety of forwarding rules that may be implemented. Again, those skilled in the art will appreciate the wide variety of classifications that are possible according to the present invention, and the resulting variety in forwarding policies that may be implemented to accommodate those classifications.

Figure 9:
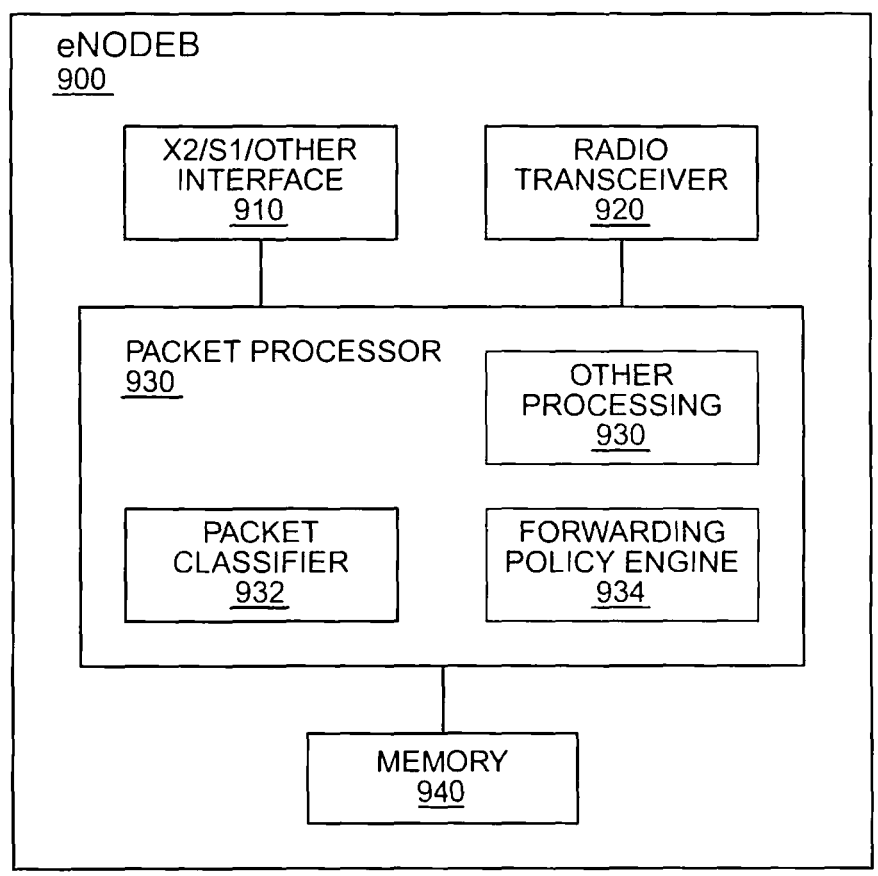
FIG. 9 illustrates an eNodeB configured to carry out one or more of the methods according to the invention.

FIG. 9 illustrates an eNodeB configured to carry out one or more of the methods described herein, eNodeB 900 comprises an interface 910 for communications between the eNodeB 900 and an access gateway (via the S1 interface) and between the eNodeB 900 and another eNodeB (via the X2 interface). Downlink packets are received from the access gateway via the interface 900 and passed to the packet processor 930. During normal operation, downlink data packets are transmitted to one or more user terminals, using radio transceiver 920, using conventional means well known to those skilled in the art.

Packet processor 930, which may comprise one or more microprocessors, microcontrollers, digital signal processors, and the like, is programmed to provide several functions, including a packet classifier 932 and a forwarding policy engine 934. Packet processor 930 also includes other processing 936, which includes for example, various Layer 1 and Layer 2 functions, as well as control of the radio transceiver 920 and other hardware in the eNodeB 900. As is well known to those skilled in the art, packet processor 930 may be configured to execute software and/or firmware stored in one or more memory circuits 940. Memory circuit 940, which may comprise any of various combinations of flash memory, random access memory, read-only memory, magnetic memory, optical storage, and the like, may contain, in addition to program code, operating data for use by packet processor 930 in carrying out any of the methods described herein. Packet processor 930 may thus be configured to carry out one or more of the methods described herein for forwarding packets during handover in a packet-switched wireless communications system.

Those skilled in the art will also appreciate that the methods described herein with reference to an eNodeB in a wireless communication system may be adapted for use at a mobile terminal 420. Accordingly, the following description relates to embodiments of the present invention as implemented in a mobile station 420 undergoing handover from a source base station to a target base station. A mobile station 420 may support one or more uplink bearers (and/or logical channels). As in the downlink scenarios described above, each uplink bearer/logical channel may have different quality attributes with respect to permissible delays, sensitivity to duplicates and losses/reliability. Likewise, each logical channel may comprise two or more IP flows, each with different service requirements. Accordingly, in one or more embodiments, a mobile station 420 may be configured to re-transmit outstanding data units of data to the target base station for a first subset of the multiple bearers, and to not re-transmit outstanding data units of data to the target base station for a second subset of the multiple bearers. Likewise, where the terminal 420 supports multiple (IP) data flows having different quality attributes such as delay, sensitivity to duplicates and losses, the mobile station 420 may be configured to re-transmit outstanding data units of data to the target base station for a first subset of the data flows, and to not re-transmit outstanding data units of data to the target base station for a second subset of the data flows. Packets corresponding to logical channels or IP flows may be classified according to one or more of the approaches discussed above.

Further embodiments of a mobile station 420 may combine elements of the methods described above. For instance, the mobile terminal 420 may have knowledge about the number of outstanding data units based on link layer status reports sent from the eNodeB to the mobile station 420; this transmission status information may be used for classifying packets and determining whether or not the packets should be transmitted. In some embodiments, the mobile station 420 may be configured to request the status reports for one or more of multiple bearers; in others, the mobile station 420 may be configured to request status reports for bearers carrying one or more of several IP flows.

With these and other variations and extensions in mind, those skilled in the art will appreciate that the foregoing description and the accompanying drawings represent non-limiting examples of the methods and devices taught herein for forwarding data packets during handover in a packet-switched wireless communications system, whether the methods and/or devices are employed in an LTE system or another wireless communications system. As such, the inventive apparatus and techniques taught herein are not limited by the foregoing description and accompanying drawings. Instead, the present invention is limited only by the following claims and their legal equivalents.

The invention claimed is:

1. A method at a source base station node for forwarding data packets during handover in a packet-switched wireless communications system, the method comprising:

determining that handover of at least one radio bearer for a served user terminal to a target base station node is imminent;

classifying a plurality of data packets received at the source base station node for transmission to the served user terminal into two or more data flow classifications according to a transmission status for each data packet, or the transmission status for each data packet and a service requirement for each data packet; and prior to the handover, selectively forwarding one or more of the data packets directly to the target base station node based on the data flow classification for each data packet;

wherein classifying a plurality of data packets comprises evaluating a radio link control (RLC) status to determine a transmission status for each data packet, and wherein selectively forwarding one or more of the data packets to the target base station node based on the data flow classification for each data packet comprises forwarding data packets having a transmission status of unacknowledged and not forwarding data packets having a transmission status of acknowledged.

2. The method of claim 1, wherein classifying a plurality of data packets comprises inspecting an Internet Protocol header for each packet to determine the corresponding service requirement.

3. The method of claim 2, wherein classifying a plurality of data packets further comprises determining a service type from the Internet Protocol header for each packet and determining a service requirement based on the service type.

4. The method of claim 3, wherein determining a service type from the Internet Protocol header comprises associating a service type with a source or destination address or source or destination port included in the Internet Protocol header.

5. The method of claim 3, wherein determining a service type from the Internet Protocol header comprises determining a service type from a type of service field in the Internet Protocol header.

6. The method of claim 3, wherein determining a service type from the Internet Protocol header comprises determining a service type from a transport protocol identified by the Internet Protocol header.

7. The method of claim 2, wherein classifying a plurality of data packets comprises inspecting a Real Time Protocol header for one or more packets and determining the corresponding service requirement from a payload type identified by the Real Time Protocol header.

8. The method of claim 2, wherein selectively forwarding one or more of the data packets to the target base station node based on the data flow classification for each data packet comprises forwarding data packets having a reliable delivery service requirement.

9. The method of claim 2, wherein selectively forwarding one or more of the data packets to the target base station node based on the data flow classification for each data packet comprises not forwarding data packets having a maximum delay service requirement.

10. The method of claim 2, wherein selectively forwarding one or more of the data packets to the target base station node based on the data flow classification for each data packet comprises evaluating a maximum delay service requirement for one or more data packets and not forwarding data packets for which the maximum delay service requirement is exceeded.

11. The method of claim 1, wherein the at least one radio bearer carries data packets corresponding to two or more IP flows and wherein classifying a plurality of data packets comprises determining relative priority levels for each of the two or more IP flows and classifying data packets associated with each IP flow according to the IP flow's relative priority level.

12. The method of claim 11, wherein selectively forwarding one or more of the data packets to the target base station node based on the data flow classification for each data packet comprises forwarding data packets associated with a first IP flow having a relatively high priority level and not forwarding data packets associated with a second IP flow having a relatively low priority level.

13. The method of claim 1, wherein the at least one radio bearer comprises two or more logical channels, each logical channel carrying data packets corresponding to one or more IP flows, and wherein classifying a plurality of data packets comprises determining relative priority levels for each of the two or more logical channels and classifying data packets associated with each logical channel according to the logical channel's relative priority level.

14. The method of claim 13, wherein determining relative priority levels for each of the two or more logical channels comprises assigning a high relative priority level to a logical channel comprising one or more IP flows having a reliable delivery service requirement.

15. The method of 13, wherein selectively forwarding one or more of the data packets to the target base station node based on the data flow classification for each data packet comprises forwarding data packets associated with a first logical channel having a relatively high priority level and not forwarding data packets associated with a second logical channel having a relatively low priority level.

16. The method of claim 1, further comprising sending forwarding information to the target base station node, the forwarding information describing a forwarding policy used by the source base station node.

17. A source base station node in a packet-switched wireless communications system, wherein the source base station node is configured to determine that handover of at least one radio bearer for a served user terminal to a target base station node is imminent, the source base station node comprising a packet processor configured to:

classify a plurality of data packets received at the source base station node into two or more data flow classifications according to a transmission status for each data packet, or the transmission status for each data packet and a service requirement for each data packet; and prior to the handover, selectively forward one or more of the data packets directly to the target base station node based on the data flow classification for each data packet;

wherein the packet processor is configured to classify the plurality of data packets by evaluating a radio link control (RLC) status to determine a transmission status for each data packet, and wherein the packet processor is configured to selectively forward one or more of the data packets to the target base station node based on the data flow classification for each data packet by forwarding data packets having a transmission status of unacknowledged and not forwarding data packets having a transmission status of acknowledged.

18. The source base station node of claim 17, wherein the packet processor is configured to classify a plurality of data packets by inspecting an Internet Protocol header for each packet to determine the corresponding service requirement.

19. The source base station node of claim 18, fur wherein the packet processor is configured to classify the plurality of data packets by determining a service type from the Internet Protocol header for each packet and determining a service requirement based on the service type.

20. The source base station node of claim 19, wherein the packet processor is configured to determine the service type from a transport protocol identified by the Internet Protocol header.

21. The source base station node of claim 18, wherein the packet processor is configured to classify the plurality of data packets by inspecting a Real Time Protocol header for one or more packets and determining the corresponding service requirement from a payload type identified by the Real Time Protocol header.

22. The source base station node of claim 18, wherein the packet processor is configured to selectively forward one or more of the data packets to the target base station node based on the data flow classification for each data packet by forwarding data packets having a reliable delivery service requirement.

23. The source base station node of claim 18, wherein the packet processor is configured to selectively forward one or more of the data packets to the target base station node based on the data flow classification for each data packet by not forwarding data packets having a maximum delay service requirement.

24. The source base station node of claim 17, wherein the at least one radio bearer carries data packets corresponding to two or more IP flows, and wherein the packet processor is configured to classify the plurality of data packets by determining relative priority levels for each of the two or more IP flows and classifying data packets associated with each IP flow according to the IP flow's relative priority level.

25. The source base station node of claim 17, wherein the at least one radio bearer comprises two or more logical channels, each logical channel carrying data packets corresponding to one or more IP flows, and wherein the packet processor is configured to classify the plurality of data packets by determining relative priority levels for each of the two or more logical channels and classifying data packets associated with each logical channel according to the logical channel's relative priority level.

26. The source base station node of claim 17, wherein the packet processor is further configured to send forwarding information to the target base station node, the forwarding information describing a forwarding policy used by the source base station node.

27. A method at a source base station node for selectively forwarding downlink data packets to a target base station node during handover of a served user terminal in a packet-switched wireless communications system, wherein each data packet belongs to one of a plurality of data flows, the method comprising:
    determining that handover of at least one radio bearer for the served user terminal to the target base station node is imminent;
    determining a transmission status of each downlink data packet;
    when a given data packet has a transmission status of acknowledged, not forwarding the given data packet to the target base station node;
    when a given data packet has a transmission status of unacknowledged:
        determining whether the given data packet belongs to a data flow having a reliable delivery service requirement;
        when the given data packet belongs to a data flow having a reliable delivery service requirement, forwarding the given packet to the target base station node;
        when the given data packet does not belong to a data flow having a reliable delivery service requirement, determining whether the given data packet belongs to a data flow having a maximum delay requirement;
        when the given data packet does not belong to a data flow having a maximum delay requirement, not forwarding the given packet to the target base station node; and
        when the given data packet belongs to a data flow having a maximum delay requirement, forwarding the given packet to the target base station node.

* * * * *

UNITED STATES PATENT AND TRADEMARK OFFICE
CERTIFICATE OF CORRECTION

PATENT NO. : 8,594,043 B2
APPLICATION NO. : 12/531781
DATED : November 26, 2013
INVENTOR(S) : Pelletier et al.

Page 1 of 1

It is certified that error appears in the above-identified patent and that said Letters Patent is hereby corrected as shown below:

On the Title Page

Item (75), under "Inventors", in Column 1, Line 2, delete "Sagfors," and insert -- Sågfors, --, therefor.

Item (75), under "Inventors", in Column 1, Line 2, delete "kyrkslatt" and insert -- kyrkslätt --, therefor.

In the Drawings

In Fig. 9, Sheet 10 of 10, delete "OTHER PROCESSING 930" and insert
-- OTHER PROCESSING 936 --, therefor.

In the Specification

In Column 4, Line 45, delete "Qos" and insert -- QoS --, therefor.

In Column 9, Line 47, delete "herein," and insert -- herein. --, therefor.

In the Claims

In Column 12, Line 24, in Claim 15, delete "method of" and insert -- method of claim --, therefor.

In Column 12, Line 63, in Claim 19, delete "fur wherein" and insert -- wherein --, therefor.

Signed and Sealed this
Fifteenth Day of July, 2014

Michelle K. Lee
*Deputy Director of the United States Patent and Trademark Office*